United States Patent
Clark et al.

(12) 
(10) Patent No.: US 11,167,826 B2
(45) Date of Patent: Nov. 9, 2021

(54) WIRELESS TROLLING MOTOR ASSEMBLY

(71) Applicant: NAVICO HOLDING AS, Egersund (NO)

(72) Inventors: Jeremiah Clark, Tulsa, OK (US); Neal Combs, Osteen, FL (US)

(73) Assignee: NAVICO HOLDING AS, Egersund (NO)

( * ) Notice: Subject to any disclaimer, the term of this patent is extended or adjusted under 35 U.S.C. 154(b) by 86 days.

(21) Appl. No.: 16/460,042

(22) Filed: Jul. 2, 2019

(65) Prior Publication Data

US 2019/0322340 A1 Oct. 24, 2019

Related U.S. Application Data

(60) Continuation-in-part of application No. 15/786,975, filed on Oct. 18, 2017, now Pat. No. 10,414,472.

(Continued)

(51) Int. Cl.
*B63B 49/00* (2006.01)
*G01S 15/89* (2006.01)
(Continued)

(52) U.S. Cl.
CPC ........... *B63B 49/00* (2013.01); *B63H 20/007* (2013.01); *G01C 21/203* (2013.01); *G01S 15/89* (2013.01);
(Continued)

(58) Field of Classification Search
CPC ....... B63B 49/00; B63B 17/00; B63H 20/007; B63H 21/21; B63H 21/213; G01C 21/203;
(Continued)

(56) References Cited

U.S. PATENT DOCUMENTS 5,884,213 A 3/1999 Carlson
6,160,764 A * 12/2000 Powell .................... B63B 49/00
367/173

(Continued)

FOREIGN PATENT DOCUMENTS

WO WO 2006/017511 A2 2/2006
WO WO 2013/126761 A1 8/2013
WO WO 2014/144471 A1 9/2014

OTHER PUBLICATIONS

"Haswing Foot Pedal Controller for Cayman Trolling Motor;" retrieved Jul. 1, 2016 from http://www.aquosinflatableboat.com/goods.php?id=102.

(Continued)

*Primary Examiner* — Behrang Badii
(74) *Attorney, Agent, or Firm* — Nelson Mullins Riley & Scarborough LLP (57) ABSTRACT

A trolling motor assembly for use with a watercraft and for wirelessly communicating marine data with a remote electronic device. The assembly includes a trolling motor housing coupled to a second end of a main shaft and having mounted therein a propulsion motor for providing propulsion power to the watercraft and a sonar transducer assembly for generating marine data about an underwater environment relative to the watercraft, and a main housing coupled to a first end of the main shaft and having mounted therein a processor for processing the marine data received from the sonar transducer assembly, and a wireless module for wirelessly transmitting the marine data to the remote electronic device.

20 Claims, 8 Drawing Sheets

Related U.S. Application Data which is a division of application No. 15/182,154, filed on Jun. 14, 2016, now Pat. No. 9,840,312.

(51) Int. Cl.
| | |
|---|---|
| *B63H 20/00* | (2006.01) |
| *G05D 1/02* | (2020.01) |
| *G01S 15/96* | (2006.01) |
| *G01C 21/20* | (2006.01) |
| *B63B 17/00* | (2006.01) |
| *A47C 31/10* | (2006.01) |
| *B63H 21/21* | (2006.01) |

(52) U.S. Cl.
CPC ............ *G01S 15/96* (2013.01); *G05D 1/0206* (2013.01); *A47C 31/10* (2013.01); *B63B 17/00* (2013.01); *B63H 21/21* (2013.01); *B63H 21/213* (2013.01)

(58) Field of Classification Search
CPC ....... G01S 15/89; G01S 15/96; G05D 1/0206; A47C 31/10
See application file for complete search history.

(56) References Cited

U.S. PATENT DOCUMENTS

| | | | |
|---|---|---|---|
| 6,273,771 B1 | 8/2001 | Buckley et al. | |
| 6,325,684 B1 | 12/2001 | Knight | |
| 6,345,179 B1 | 2/2002 | Wiegers et al. | |
| 6,415,209 B1 | 7/2002 | Reimer | |
| 6,909,946 B1 | 6/2005 | Kabel et al. | |
| 7,399,211 B1 * | 7/2008 | Spaulding ............ | B63H 20/007 248/640 |
| 8,645,012 B2 | 2/2014 | Salmon et al. | |
| 8,761,976 B2 | 6/2014 | Salmon et al. | |
| 9,132,900 B2 | 9/2015 | Salmon et al. | |
| 9,162,743 B2 * | 10/2015 | Grace .................... | G06F 3/14 |
| 9,628,592 B2 | 4/2017 | Wu | |
| 9,840,312 B1 | 12/2017 | Clark | |
| 9,989,639 B2 | 6/2018 | Wu | |
| 2009/0037040 A1 * | 2/2009 | Salmon ................ | B63H 21/21 701/21 |
| 2009/0105952 A1 | 4/2009 | Grace et al. | |
| 2012/0015566 A1 * | 1/2012 | Salmon ................ | G01C 21/00 440/1 |
| 2012/0232719 A1 | 9/2012 | Salmon et al. | |
| 2014/0336854 A1 | 11/2014 | Salmon et al. | |
| 2015/0100658 A1 * | 4/2015 | Lieberman ........... | H04L 67/025 709/208 |
| 2015/0346729 A1 * | 12/2015 | Grace .................... | G01S 15/89 701/2 |
| 2016/0207602 A1 | 7/2016 | Clark | |
| 2016/0325814 A1 | 11/2016 | Antao et al. | |
| 2017/0355430 A1 | 12/2017 | Clark | |
| 2018/0050773 A1 | 2/2018 | Clark | |

OTHER PUBLICATIONS

"I-Pilot Remote for Trolling Motors;" retrieved Jul. 1, 2016 from http://www.minnkotamotors.com/Products/i-PILOT-REMOTE/.

"Bass Pro Shops Prowler T30/30 Trolling Motor;" retrieved Jul. 1, 2019 from https://www.basspro.com/shop/en/bass-pro-shops-prowler-t30-30-trolling-motor.

"Endura;" *Minn Kota*; retrieved Jul. 1, 2019 from https://minnkotamotors.johnsonoutdoors.com/freshwater-trolling-motors/endura-0.

\* cited by examiner

WIRELESS TROLLING MOTOR ASSEMBLY

RELATED APPLICATION

The present application is a continuation-in-part patent application of U.S. patent application Ser. No. 15/786,975, filed Oct. 18, 2017, and entitled "Integrated Display for a Trolling Motor", which is a divisional patent application of U.S. patent application Ser. No. 15/182,154, filed Jun. 14, 2016, issued as U.S. Pat. No. 9,840,312 on Dec. 12, 2017, and entitled "Integrated Display for a Trolling Motor", the contents of each being incorporated by reference herein in their entireties.

FIELD OF THE INVENTION

The present invention is generally related to trolling motor assemblies for recreational vehicles such as watercrafts, and more particularly relates to systems, assemblies, and associated methods for wirelessly communicating between a trolling motor assembly and a remote electronic device.

BACKGROUND OF THE INVENTION

Trolling motors are often used during fishing or other marine activities and are mounted to recreational vehicles, such as watercraft, in a known manner. The trolling motors are mounted or attached to the watercraft and propel the watercraft along a body of water. For example, trolling motors may provide secondary propulsion or precision maneuvering that can be ideal for fishing activities. The trolling motors, however, may also be utilized for the main propulsion system of watercraft. Further, there are many helpful marine data features, such as navigation, sonar, motor/vessel gauges, among others, that can be used by operators or users of the watercraft with a trolling motor. The present invention is directed to systems, assemblies, and methods that improve the overall capabilities of trolling motors.

SUMMARY OF THE INVENTION

An object of the present invention is to provide a trolling motor assembly that has wireless capabilities for communicating with a remote electronic device.

Depending upon the desired activity, an operator or user of the watercraft with the trolling motor assembly may wish to communicate known or helpful marine data with a remote electronic device, such as a smartphone. In this regard, the user may want to view a screen that shows images of the corresponding marine data or provide input via a corresponding user interface.

Current systems, however, require a separate screen and/or user interface to facilitate such interaction. This requires separate equipment, a separate power source, and a separate space within the watercraft. In this regard, trolling motor assemblies are sometimes attached to a watercraft in positions that align with where the fisherman fishes from the watercraft—often being disposed away from the main control center and user interface of the watercraft. Additionally, in some cases, the watercraft may be relatively small, thereby providing limited space for extra equipment. Thus, embodiments of the present invention seek to provide trolling motor assemblies that include a wireless module, such as a Wi-Fi module, that enables the trolling motor assembly to wirelessly communicate marine data with a remote electronic device. This provides an easy-to-use and compact assembly that provides all necessary features for the user at their fingertips—saving space and allowing the user to receive all pertinent information at their current position on the watercraft. Further, such trolling motor assemblies can be easily removed from small watercraft (e.g., Jon boats) and stored separately and/or transferred to other watercraft—which provides for increased security and ease of use.

According to the present invention, the trolling motor assembly includes a main housing that has selected electronic components mounted therein, including a wireless module, such as a Wi-Fi module. The main housing is coupled to a top portion of a shaft, which in turn is coupled at an opposite end thereof to a trolling motor housing. The trolling motor housing includes a propulsion motor, one or more sensors, and a sonar transducer assembly. The sonar transducer assembly generates sonar data; and the sensors and other electronic components of the trolling motor housing and the main housing generate other types of marine data (e.g., wind data, temperature data, location data, etc.). The marine data, including the sonar data, is transmitted to the Wi-Fi module, which in turn transmits the data to a remote electronic device. For example, a user may have a smartphone with a software application stored thereon that easily syncs with the trolling motor assembly and receives the marine data for display thereon.

In an example embodiment, a trolling motor assembly for use with a watercraft and for wirelessly communicating marine data with a remote electronic device is provided. The remote electronic device includes a marine display software application stored thereon and a display for displaying the marine data. The trolling motor assembly comprises a main shaft having a first end and an opposed second end. The trolling motor assembly comprises a releasable mount for releasably mounting the trolling motor assembly to the watercraft. The trolling motor assembly comprises a trolling motor housing coupled to the second end of the main shaft. The trolling motor has mounted therein a propulsion motor for providing propulsion power to the watercraft and a sonar transducer assembly for generating sonar return data corresponding to an underwater environment relative to the watercraft. The sonar transducer assembly is configured to transmit sonar signals into the underwater environment, receive sonar returns from the underwater environment, and convert the sonar returns into the sonar return data. The trolling motor assembly comprises a main housing coupled to the first end of the main shaft. The main housing has mounted therein a processor for processing the sonar return data received from the sonar transducer assembly. The processor is configured to receive the sonar return data from the sonar transducer assembly and generate sonar image data based on the sonar return data. The main housing has further mounted therein a wireless module for wirelessly transmitting the marine data to the remote electronic device. The marine data includes the sonar image data such that the sonar image data is displayable as a sonar image on the display of the remote electronic device using the marine display software application. The sonar image represents the underwater environment relative to the watercraft.

In some embodiments, the wireless module comprises a Wi-Fi module. In some embodiments, the trolling motor housing further comprises one or more sensors for generating sensor related marine data. The sensor related marine data is received by the Wi-Fi module and wirelessly transmitted thereby to the remote electronic device. In some embodiments, the one or more sensors included in the trolling motor housing comprises at least a temperature sensor.

In some embodiments, the main housing includes one or more sensors for generating marine data. In some embodiments, the one or more sensors included in the main housing comprises at least a wind sensor.

In some embodiments, the wireless module comprises a short-range wireless communication module such that the wireless module is paired with a corresponding wireless module of the remote electronic device.

In another example embodiment, a trolling motor assembly for use with a watercraft and for wirelessly communicating marine data with a remote electronic device is provided. The trolling motor assembly comprises a releasable mount for releasably mounting the trolling motor assembly to the watercraft and a trolling motor housing connected to a main housing by a main shaft. The trolling motor housing includes a propulsion motor for providing motor power to the watercraft, and a marine data generator for generating the marine data. The main housing includes a processor for processing the marine data to form marine image data that is displayable on the remote electronic device, and a wireless module for wirelessly transmitting the marine data to the remote electronic device to cause display of the marine image data.

In some embodiments, the marine data generator comprises a sonar transducer assembly for generating sonar return data corresponding to an underwater environment relative to the watercraft. The sonar transducer assembly is configured to transmit sonar signals into the underwater environment, receive sonar returns from the underwater environment, and convert the sonar returns into the sonar return data. In some embodiments, the marine image data is sonar image data, and wherein the sonar return data is processed by the processor in the main housing to generate the sonar image data therefrom. The sonar image data is wirelessly transmitted by the wireless module to the remote electronic device for display thereon. In some embodiments, the wireless module comprises a Wi-Fi module. In some embodiments, the wireless module comprises a short-range wireless communication module such that the wireless module is paired with a corresponding wireless module of the remote electronic device.

In some embodiments, the marine data generator further comprises one or more sensors for generating sensor type marine data.

In yet another example embodiment, a method of wirelessly transmitting marine data from a trolling motor assembly of a watercraft to a remote electronic device having a marine display software application stored thereon and a display for displaying the marine data is provided. The method comprises providing a trolling motor assembly comprising a main shaft having a first end and an opposed second end. The trolling motor assembly further includes a releasable mount for releasably mounting the trolling motor assembly to the watercraft and a trolling motor housing coupled to the second end of the main shaft. The trolling motor housing has mounted therein a propulsion motor for providing propulsion power to the watercraft and a sonar transducer assembly for generating sonar return data corresponding to an underwater environment relative to the watercraft. The sonar transducer assembly is configured to transmit sonar signals into the underwater environment, receive sonar returns from the underwater environment, and convert the sonar returns into the sonar return data. The trolling motor assembly further includes a main housing coupled to the first end of the main shaft and having mounted therein a processor for processing the sonar return data received from the sonar transducer assembly. The processor is configured to receive the sonar return data from the sonar transducer assembly and generate sonar image data based on the sonar return data. The main housing further has mounted therein a wireless module. The method further includes receiving the sonar return data from the sonar transducer assembly, processing the sonar return data to generate the sonar image data, and wirelessly transmitting the marine data to the remote electronic device. The marine data includes the sonar image data such that the sonar image data is displayable as a sonar image on the display of the remote electronic device using the marine display software application. The sonar image represents the underwater environment relative to the watercraft.

In some embodiments, the wireless module comprises a Wi-Fi module. In some embodiments, the trolling motor housing further comprises one or more sensors for generating sensor related marine data. The sensor related marine data is received by the Wi-Fi module and wirelessly transmitted thereby to the remote electronic device. In some embodiments, the one or more sensors included in the trolling motor housing comprises at least a temperature sensor.

In some embodiments, the wireless module comprises a short-range wireless communication module, and wherein the method further comprises pairing the wireless module with a corresponding wireless module of the remote electronic device.

In some embodiments, the main housing includes one or more sensors for generating marine data. In some embodiments, the one or more sensors included in the main housing comprises at least a wind sensor.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Exemplary embodiments of the present invention now will be described more fully hereinafter with reference to the accompanying drawings, in which some, but not all embodiments of the invention are shown. Indeed, the present invention may be embodied in many different forms and should not be construed as limited to the exemplary embodiments set forth herein. Rather, these embodiments are provided so that this disclosure will satisfy applicable legal requirements. Like reference numerals refer to like elements throughout the various views and Figures.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

Figure 1:
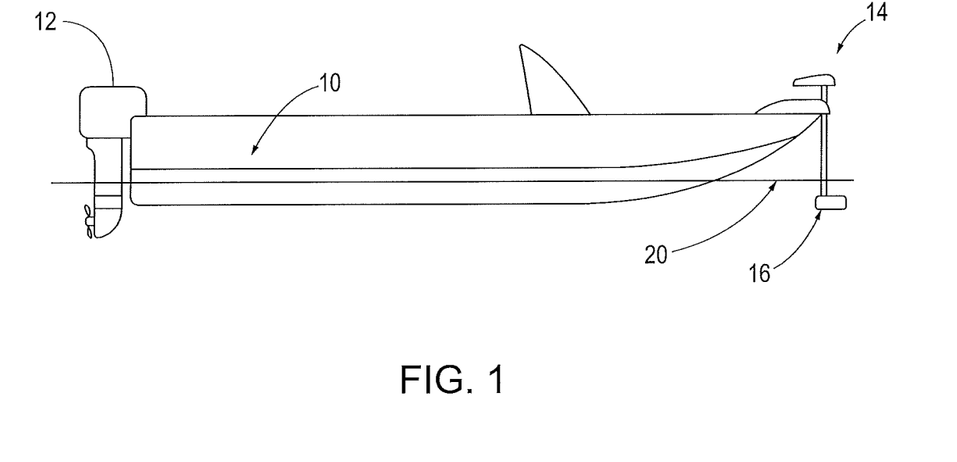
FIG. 1 illustrates an exemplary trolling motor assembly attached to a front of a watercraft, in accordance with the teachings of the present invention.

FIG. 1 illustrates an example watercraft 10 on a body of water 20. The watercraft 10 has a primary or main propulsion system indicated as motor 12 and a secondary propulsion system indicated as trolling motor assembly 14, which can be attached to a front portion of the watercraft. The trolling motor assembly 14 can include a trolling motor 16 that is typically submerged in the body of water 20 during use. The trolling motor assembly 14 can be used as a propulsion system to cause the watercraft to travel along the surface of the water 20. While the depicted embodiment shows the trolling motor assembly 14 attached to the front of the watercraft 10 and as a secondary propulsion system, example embodiments described herein contemplate that the trolling motor assembly 14 may be attached in any position or location on the watercraft 10 and/or may be the sole or primary propulsion system for the watercraft 10. Depending on the design and type of the trolling motor assembly 14, the trolling motor 16 may be a gas-powered motor or an electric motor. Moreover, steering may be accomplished manually via hand control, via foot control, or through use of a remote control. Additionally, in some cases, an autopilot may autonomously operate the trolling motor assembly 14.

Figure 2:
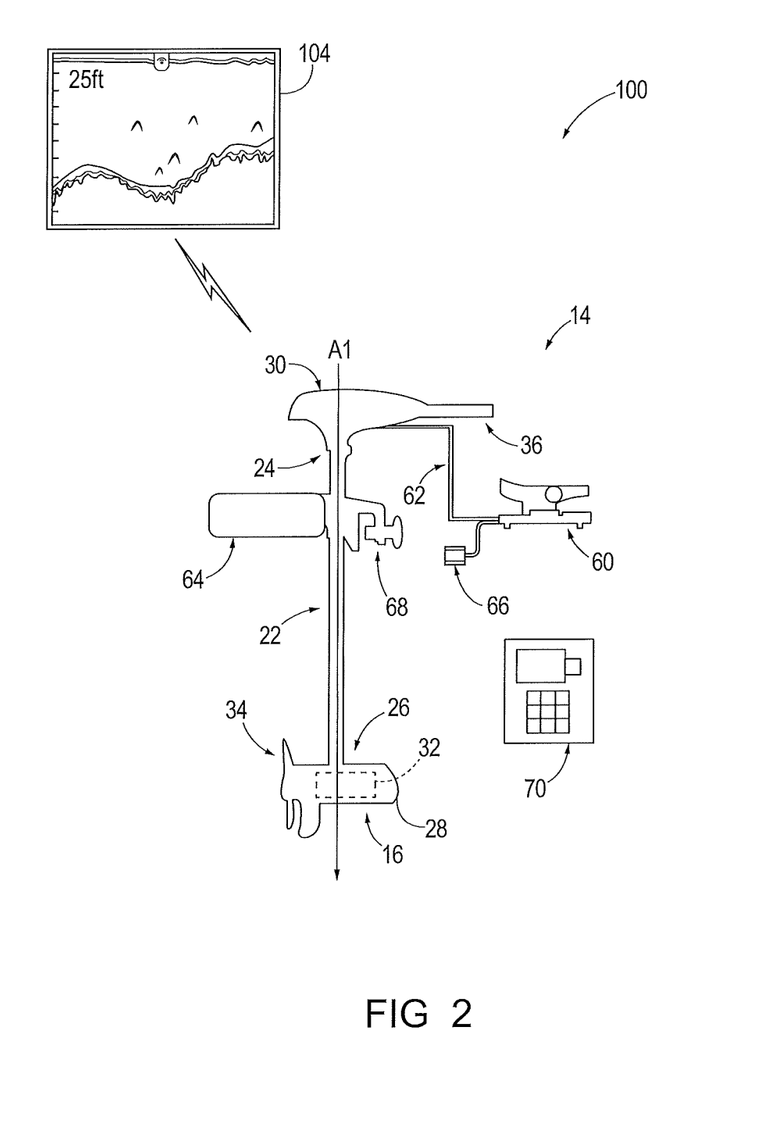
FIG. 2 illustrates a suitable trolling motor assembly for implementing the features of the present invention along with a remote electronic device.

FIG. 2 illustrates a trolling motor communication system 100 that includes a trolling motor assembly 14 that wirelessly communicates with a remote electronic device 104. The illustrated remote electronic device 104 can include a display and includes suitable hardware and software, such as a suitable software application, capable of processing and displaying marine data on the display. The trolling motor assembly 14 can be electric and can be controlled by hand through an optional hand control rod 36 or through an optional foot pedal assembly 60. The trolling motor assembly 14 includes a main shaft 22 having a first end 24 coupled to a main housing 30 for housing, among other components, a wireless module, a second end 26 coupled to the trolling motor 16, and a steering assembly 64. The trolling motor 16 also includes a trolling motor housing 28 that is attached to the second end 26 of the shaft 22 and at least partially contains an internal propulsion motor 32 that mechanically and operatively connects to a propeller 34. As shown in FIG. 1, in some embodiments, when the trolling motor 16 of the trolling motor assembly 14 is attached to the watercraft 10 and the associated propulsion motor 32 (or trolling motor housing 28) is submerged in the water, the propulsion motor 32 is configured to propel the watercraft to travel along the body of water 20. In addition to containing the propulsion motor 32, the trolling motor housing 28 may include other additional components, such as, for example, a sonar transducer assembly and/or other sensors or features (e.g., lights, temperature sensors, etc.), as shown in and described with respect to FIGS. 6 and 7.

The main housing 30 of the trolling motor assembly 14 is connected or attached to the first end 24 of the shaft 22 and can include a hand control rod 36, such as a handle, that enables control of the propulsion motor 32 by a user, such as for example through angular rotation of the shaft 22 and associated housing 30 about axis A1. The main housing 30 can include processing circuitry, such as a processor and associated memory. The processing circuitry may be configured to control the steering assembly 64 based on a current operating mode and to process data received from the trolling motor housing 28, such as for example sonar return data generated by the sonar transducer assembly. In some embodiments, the hand control rod 36 may include a throttle, such as a thumb lever throttle or a rotating hand throttle, that is configured to control the speed of the trolling motor 32. In some embodiments, the trolling motor assembly 14 may be steered remotely using a handheld remote control 70, the foot pedal assembly 60, and/or other remote computing device (such as a remote marine electronics device—e.g., a device used for controlling other features of the watercraft). The illustrated trolling motor assembly 14 can also include an optional foot pedal assembly 60 that is enabled to control operation of the trolling motor assembly 14, as is known in the art.

As shown in FIG. 1, in some embodiments, when the trolling motor assembly 14 is attached to the watercraft 10 and the propulsion motor 32 is submerged in the water, the main housing 30 is positioned out of the body of water and is visible/accessible by the user. The main housing 30 may be configured to house selected components of the trolling motor assembly 14, such as those components that may be used for processing acquired marine data and/or controlling operation of the trolling motor 16, among other things. For example, depending on the configuration and features of the trolling motor assembly 14, the trolling motor assembly may contain, for example, one or more of a processor, a sonar assembly, associated memory, a communication interface, an autopilot navigation assembly, a speed actuator, and a steering actuator for the propulsion motor 32, as shown for example in FIGS. 6 and 7.

The trolling motor assembly 14 may also include an attachment device 68 (e.g., a clamp, a mount, or a plurality of fasteners) to enable removable connection or attachment of the trolling motor assembly 14 to the watercraft 10. For example, the attachment device can be a releasable mount for releasably mounting the trolling motor assembly 14 to the watercraft 10. Depending upon the particular attachment device used, the trolling motor assembly 14 can be configured for rotational movement relative to the watercraft about the shaft axis A1, including, for example, 360 degree rotational movement.

The illustrated foot pedal assembly 60 can be electrically connected to the propulsion motor 32 via the main housing 30 by way of a cable 62. The foot pedal assembly 60 enables a user to steer and/or otherwise operate the trolling motor assembly 14 to control the direction and speed of travel of the watercraft 10. In an example embodiment, the foot pedal assembly 60 may provide steering commands, which in turn are used to cause the steering assembly 64 to steer the trolling motor housing 28 about axis A1 in a desired rotational direction. In some embodiments, though not shown, the foot pedal assembly 60 may be connected to the shaft 22 and utilize direct mechanical steering, such as through ropes or wires and the like, to cause steering or movement of the trolling motor housing 28. Further, depending upon the configuration of the foot pedal assembly 60, the foot pedal assembly 60 may include an electrical plug 66 that can be connected to an external power source.

Additionally or alternatively, the trolling motor assembly 14 may include a handheld remote control 70. The handheld control 70 may be wired or wirelessly connected to the main housing and provide steering commands, similar to the steering commands discussed above with reference to the foot pedal assembly 60. The handheld remote control 70 can be a dedicated control unit or alternatively can be a control interface executed on a user electronic device, such as for example a tablet computer, a smart phone, a laptop computer and the like.

Figure 3:
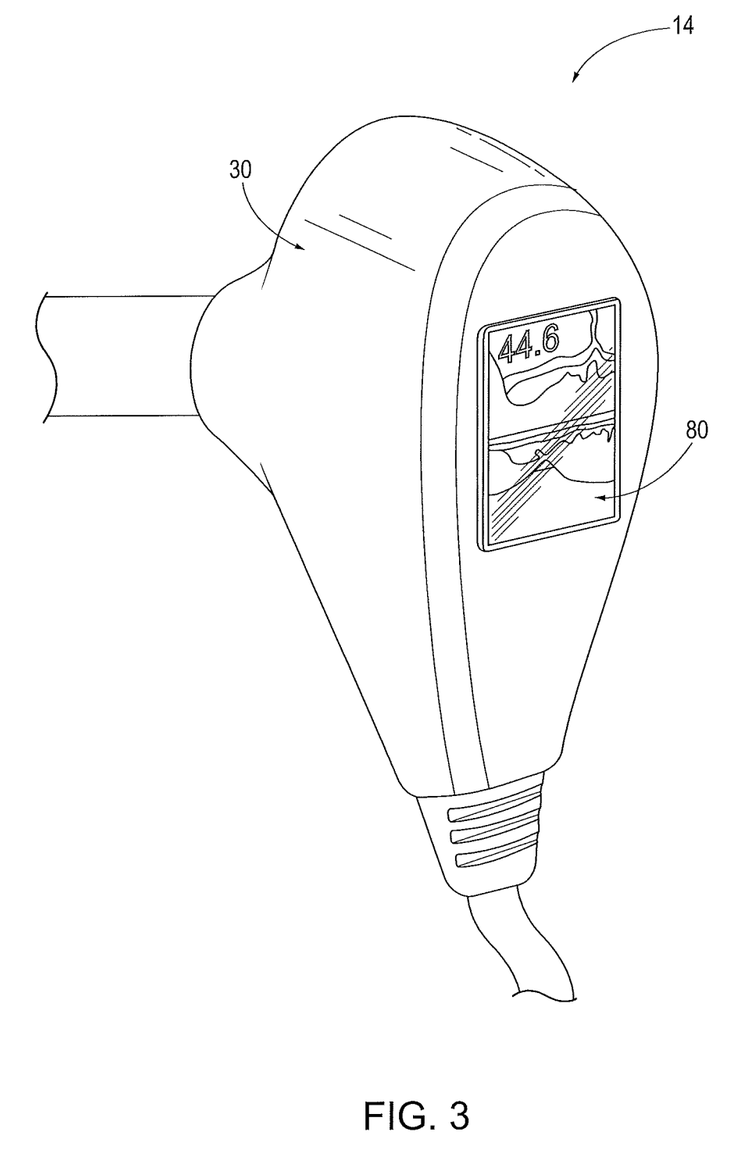
FIG. 3 shows an example main housing for a trolling motor assembly, wherein a screen is integrated into the main housing, in accordance with some embodiments disclosed herein.

FIG. 3 illustrates an exemplary main housing 30 of the trolling motor assembly 14, wherein a display and/or user interface 80 is integrated with the main housing 30. In particular, the display and/or user interface 80 is contained within the physical structure of the main housing 30. In some embodiments, the display and/or user interface 80 is configured to display marine data. In the illustrated example embodiment, the screen portion of the display 80 is presenting sonar imagery, though images of other types of marine data can be also be displayed, as will be readily apparent to one of ordinary skill in the art. In other embodiments, the display and/or user interface 80 may be a screen that is configured to merely present images and not receive user input. In still other embodiments, the display and/or user interface 80 may be a user interface such that it is configured to receive user input in some manner or faun. For example, the screen may be a touch screen that enables touch input from a user. Additionally or alternatively, the user interface may include one or more buttons (not shown) that enable user input.

Figure 4:
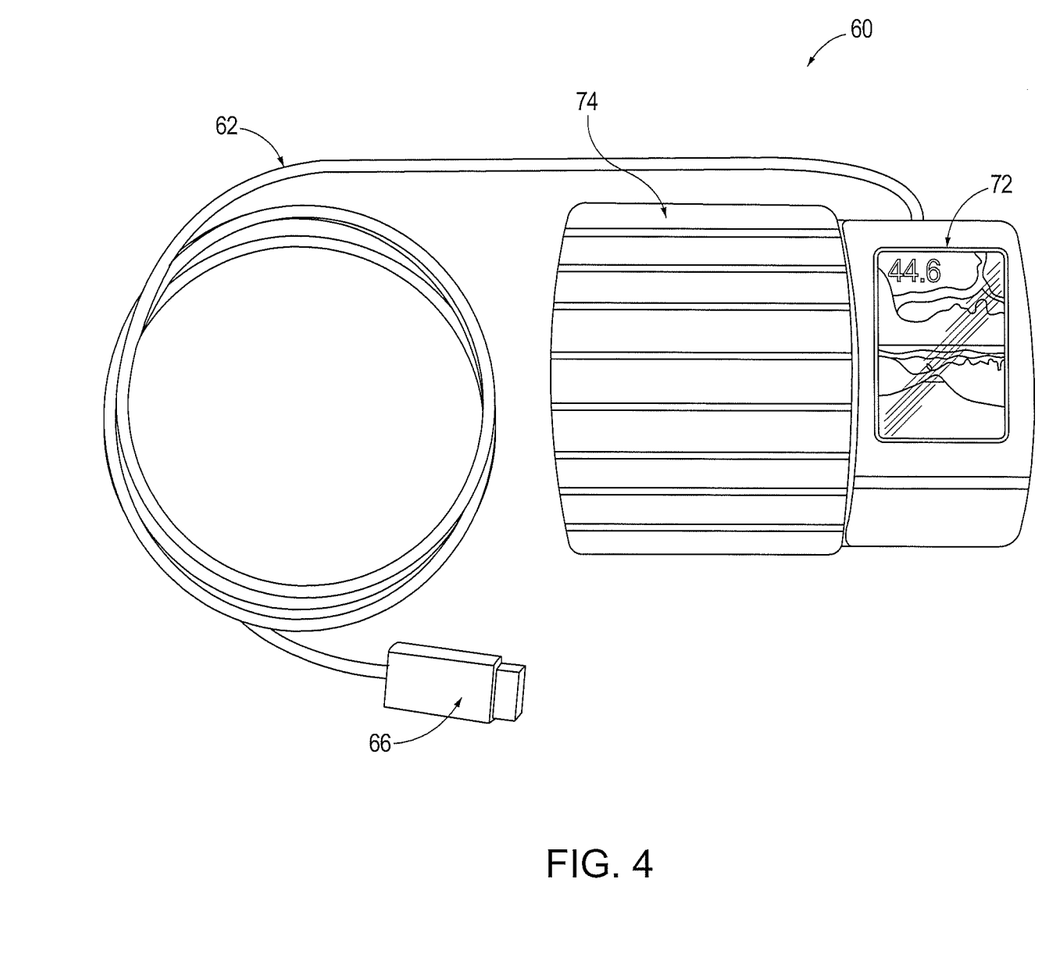
FIG. 4 shows an example foot pedal housing for a trolling motor assembly, wherein the screen is integrated into the foot pedal housing, in accordance with some embodiments disclosed herein.

FIG. 4 illustrates an exemplary foot pedal assembly 60 for the trolling motor assembly 14 of the present invention that includes a display and/or user interface 72 that is integrated with and contained within the housing 74 of the foot pedal assembly. In some embodiments, the display and/or user interface 72 is configured to display marine data. In the depicted embodiment, the screen of the display and/or user interface 72 is presenting sonar imagery (though images of other types of marine data can be presented). In some embodiments, the display and/or user interface 72 may be a screen that is configured to merely present images and not receive user input. In other embodiments, the display and/or user interface 72 may be a user interface such that it is configured to receive user input in some form. For example, the screen may be a touch screen that enables touch input from a user. Additionally or alternatively, the user interface may include one or more buttons (not shown) that enable user input.

In the present invention, the trolling motor assembly 14 is adapted to wirelessly communicate with one or more peripheral remote electronic devices, such as for example a smartphone, tablet or laptop. As shown for example in FIG. 5, a trolling motor communication system 100 includes a remote electronic device 104 that can be mobile and communicates with the trolling motor assembly 14 of the present invention via a network 102. Alternatively, the remote electronic device 104 can communicate directly with the trolling motor assembly 14. The illustrated trolling motor assembly 14 is shown in simplified form, and is shown in greater detail in FIGS. 6 and 7. The trolling motor assembly 14 includes a housing having a processor 110, a wireless communication module such as a Wi-Fi module 108, and a marine data generator 112. Other components can also be included in the housing including for example a propulsion motor 32 and sensors 145, 165. The marine data generator 112 generates marine data from a variety of sensors and components, and communicates the marine data either directly to the Wi-Fi module 108 for transmission to the remote electronic device 104 or to the processor 110 for further processing. The further processed marine data can then be conveyed from the processor 110 to the Wi-Fi module 108 for subsequent transmission to the remote electronic device 104. The marine data generated by the trolling motor assembly 14 can be transmitted to the network 102 via the wireless signals 114A, which in turn can be transmitted from the network 102 to the remote electronic device 104 via wireless signals 114B. The phrase "marine data" as used herein can include one or more of sonar related data including sonar return data and sonar image data, temperature data associated with the environment of the trolling motor assembly, including external temperature data and water temperature data, location and position related information such as GPS data, chart data, weather data, engine data, watercraft operational data, compass data, orientation data, radar data, and data associated with the environment of the water, such as presence and/or location of selected objects in the water, including topographical data, fish data and the like, as well as other types of data. The wireless communication module of the present invention can employ, instead of or in addition to the illustrated Wi-Fi module 108, a Bluetooth module, a short-range communication module (e.g., to pair with the remote electronic device), a cellular communication module and the like. As such, the trolling motor assembly 14 of the present invention is configured to wirelessly transmit either directly or through the network 102 marine specific data to the remote electronic device.

Figure 6:
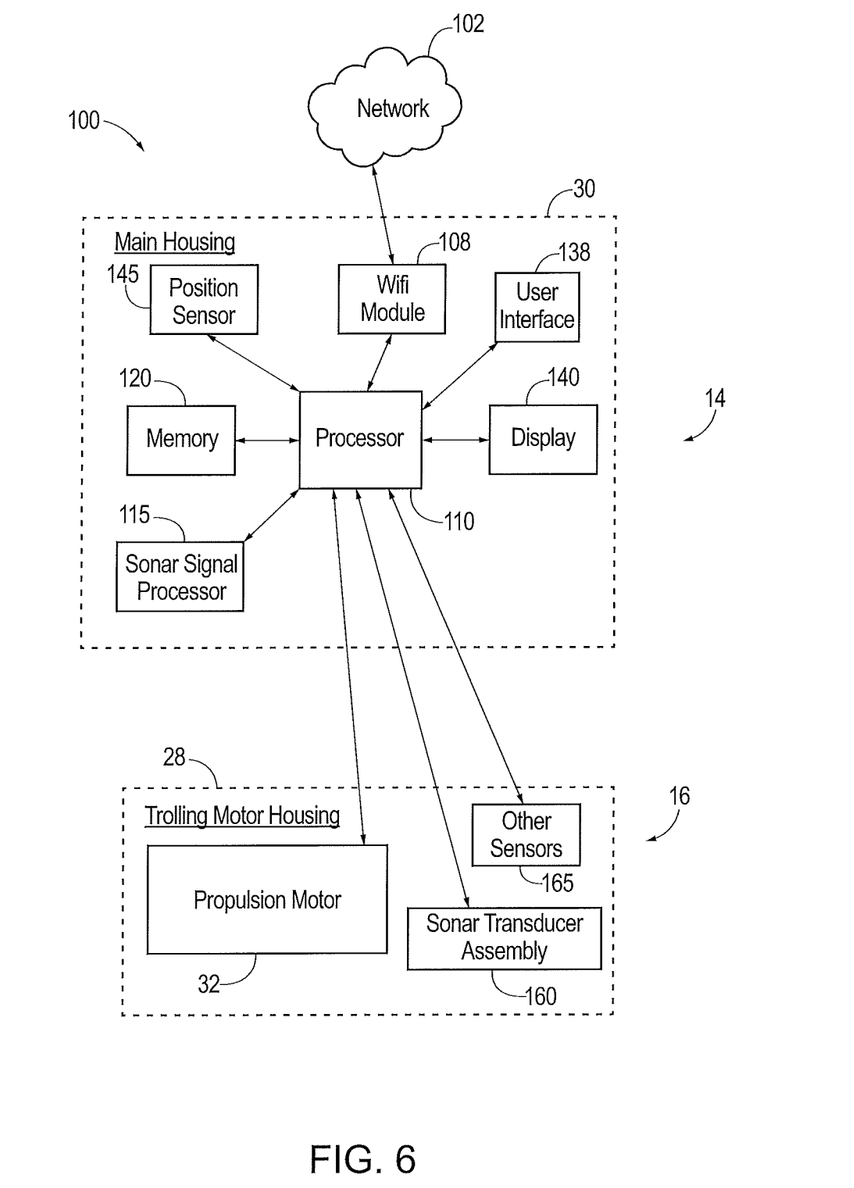
FIG. 6 is a schematic block diagram illustrating an exemplary trolling motor assembly employing a wireless module according to the teachings of the present invention.

FIG. 6 is a more detailed schematic block diagram of an exemplary trolling motor assembly 14 capable of implementing the wireless features of the present invention, and which can be used in connection with the illustrated communication system 100. As shown, the trolling motor assembly 14 can include a number of different modules or components, each of which may comprise any device or means embodied in either hardware, software, or a combination of hardware and software, and which are configured to perform one or more corresponding functions. For example, the trolling motor assembly 14 includes the main housing 30 and a trolling motor housing 28. The main housing 30 includes one or more communication modules configured to communicate with one another in any of a number of different manners including, for example, via a network. In this regard, the Wi-Fi module 108 can include a communication interface that includes any of a number of different communication backbones or frameworks. The marine data generator 112 of the present invention can include one or more of the sonar transducer assembly 160 and associated signal processing, sensors, compasses, radar displays and the like. An exemplary embodiment is set forth in FIGS. 6 and 7, although one of ordinary skill will readily recognize in light of the teachings herein that other types of marine data generating components can be included and arranged in any selected manner in the trolling motor assembly 14. For example, the main housing 30 can include the processor 110, a sonar signal processor 115, a memory 120, a user interface 135, a display 140, and one or more sensors (e.g., position sensor 145). Those of ordinary skill will readily recognize that the sonar signal processor 115 and the processor 110 can be combined into one or more processing components that can be distributed throughout the trolling motor assembly 14.

The processor 110 and/or the sonar signal processor 115 may be any means configured to execute various programmed operations or instructions stored in memory (e.g., memory 120), such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide marine or sonar data indicative of the size, location, shape, etc. of objects detected by the system 100. For example, one or more of the processors 110, 115 may be configured to receive sonar return data from the sonar transducer assembly 160 and process the sonar return data to generate sonar image data for display to a user, such as via the display 140. Further, the sonar image data which is generated by one or more of the processors 110, 115 in the main housing 30 is wirelessly transmitted via the network 102 by the Wi-Fi module 108 to the remote electronic device 104. The sonar image data can be displayed on a display unit of the remote electronic device.

In some embodiments, the processor 110 may be further configured to implement signal processing or enhancement features to improve the display characteristics of data or images, collect or process additional data, such as time, temperature, GPS information, waypoint designations, or others, or may filter extraneous data to better analyze the collected data. It may further implement notices and alarms, such as those determined or adjusted by a user, to reflect depth, presence or absence of fish, proximity of other watercraft, and the like. The memory element 120 can be configured to store instructions, computer program code, marine data, and other data associated with the sonar system in a non-transitory computer readable medium for subsequent use, such as by the processors 110, 115.

The communication module, such as the Wi-Fi module 108 and any associated communication interface, may be configured to enable connection to external devices and systems, such as for example to the network 102 and the remote electronic device 104. In this manner, the processor 110 may retrieve stored data from a remote, external server via the network 102 in addition to or as an alternative to the onboard memory 120.

The position sensor 145 may be configured to determine the current position and/or location of the main housing 30. For example, the position sensor 145 may comprise a GPS or other location detection system. The display 140 may be configured to display images and may include or otherwise be in communication with a user interface 135 configured to receive input from a user. The display 140 may be, for example, a conventional LCD (liquid crystal display), a touch screen display, mobile device, or any other suitable display known in the art upon which images may be displayed. In any of the embodiments, the display 140 may present one or more sets of marine data or images generated from the one or more sets of data, such as from the sonar image data. In some embodiments, the display may be configured to present such marine data simultaneously, for example in split-screen mode. In some embodiments, a user may select any of the possible combinations of the marine data for display. Further, the user interface 135 may include, for example, a keyboard, keypad, function keys, mouse, scrolling device, input/output ports, touch screen, or any other mechanism by which a user may interface with the system.

The trolling motor housing 28 may include a trolling propulsion motor 32, the sonar transducer assembly 160, and one or more other sensors 165 (e.g., water temperature, current, etc.), which may each be controlled through the processor 110 as detailed herein. The trolling motor 16 provides the power supplied by the assembly 14 to propel the watercraft along the water. The sonar transducer assembly can be any selected and known sonar transducer assembly for generating sonar return data corresponding to an underwater environment relative to the watercraft. For example, the sonar transducer assembly 160 can employ one or more transducers to interrogate a selected underwater spatial region or area. The sonar transducer assembly is thus configured to transmit sonar signals into the underwater environment, receive sonar returns from the underwater environment, and convert the sonar returns into the sonar return data. The sonar return data is conveyed to one or more of the processors 110, 115 of the main housing 30, which serve to convert the sonar return data into sonar image data. The other sensors can provide any selected additional marine data for use by the trolling motor assembly 14.

Figure 7:
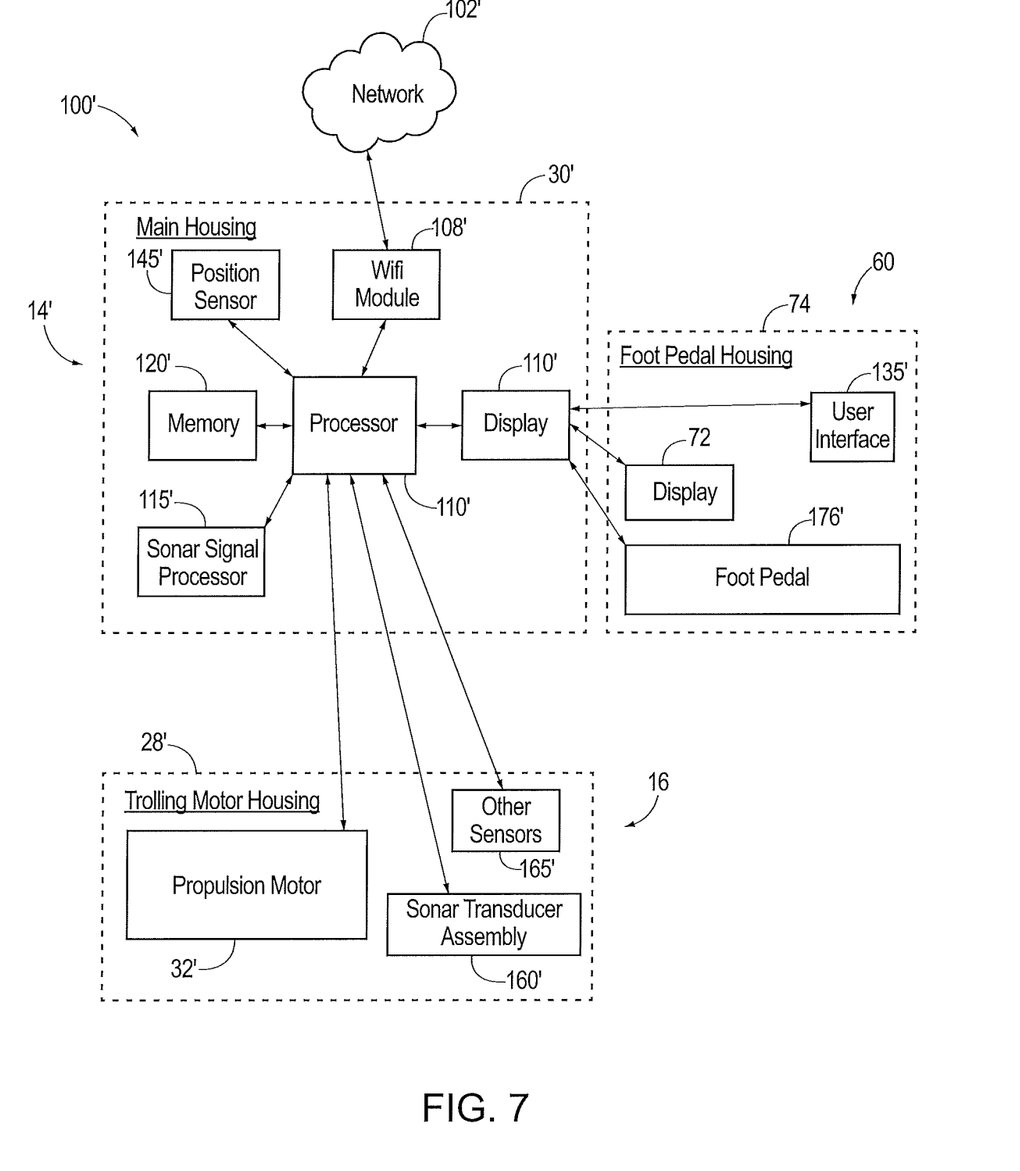
FIG. 7 shows a block diagram illustrating another exemplary trolling motor assembly employing a foot pedal assembly with an optional display according to the teachings of the present invention.

FIG. 7 is a schematic block diagram of an example trolling motor assembly 14' capable for use with several embodiments of the present invention. The trolling motor assembly 14' is similar to and includes many of the same components as the trolling motor assembly 14 shown in FIG. 6. Notably, however, different from the trolling motor assembly 14 of FIG. 6, the trolling motor assembly 14' of FIG. 7 further includes the foot pedal assembly 60 having the foot pedal housing 74 that includes a foot pedal 176', the display 72, and a user interface 135', which may each be connected to the processor 110 (such as detailed herein). In this regard, the depicted embodiment of FIG. 7 shows that the main housing 30' does not include the display 140' or user interface 135', as it is instead located within the foot pedal housing 74, although some embodiments of the present invention contemplate inclusion of the display 140' and/or user interface 135' in the main housing.

Figure 5:
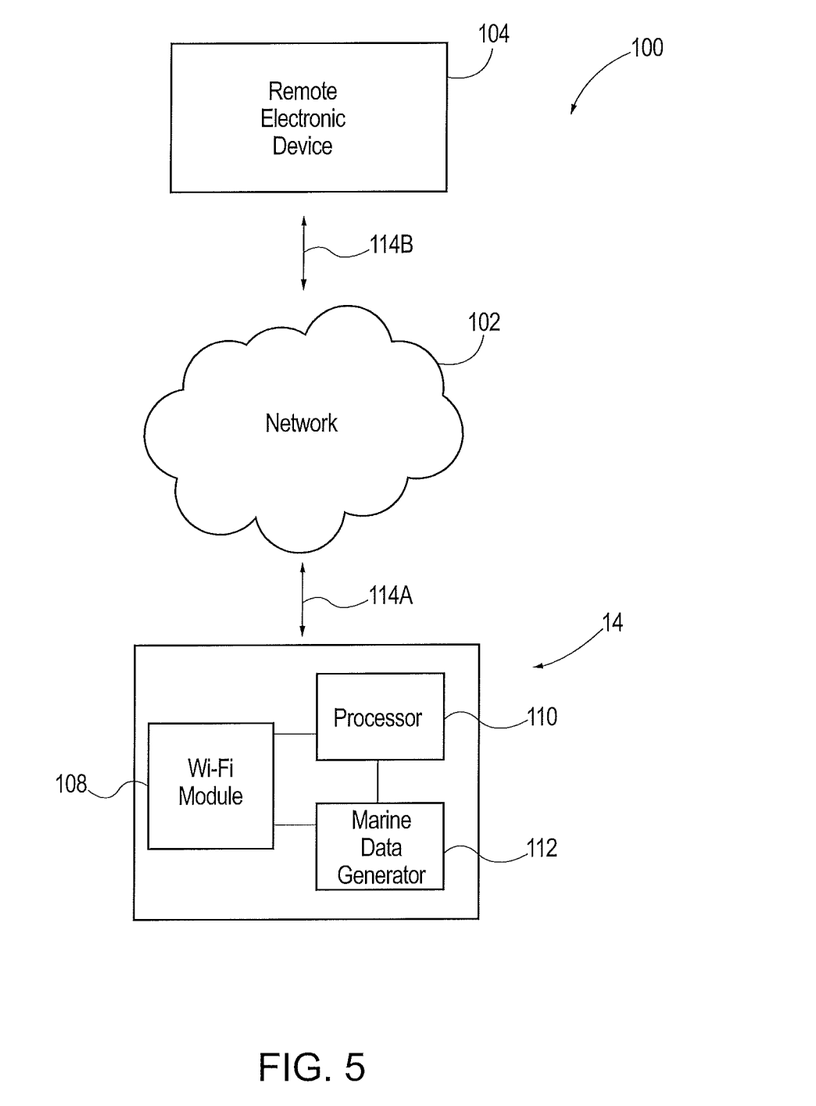
FIG. 5 is a schematic block diagram depicting a communication system that employs a trolling motor assembly with a wireless module according to the teachings of the present invention.

The trolling motor assembly 14 is connectable to the remote electronic device 104 either directly or through the network 102, which can include a cellular network, and is configured to wirelessly transmit marine data to the device 104. The remote electronic device 104 can communicate with the trolling motor assembly 14 via the wireless module (e.g., the Wi-Fi module 108) in order to receive information collected by the sonar transducer assembly, and to display or present the sonar data and if desired other types of marine data to the user on a display. The remote electronic device 104 can hence be any suitable device capable of processing received data, such as marine data, and then storing and displaying the marine data, for presentation to a user. The remote electronic device 104 can include a suitable software application that allows the device to display in a selected manner and format marine data received thereby and transmitted from the trolling motor assembly 14. For example, the remote electronic device can receive marine data in the form of sonar image data that is displayed on the display portion of the device. The remote electronic device 104 can also be connectable to an external display device for displaying the marine data. As noted above, the remote electronic device 104 can be a smartphone, tablet computer, laptop computer and the like, and can also include a computing device that is coupled to or integrated with the watercraft. The term "remote" is intended to include two or more devices that are physically and spatially separated from each other and connectable so as to communicate through a wired or wireless connection or interface. The remote electronic device 104 can include one or more processors, a local power source, a communication interface for communicating with external devices, input/output interfaces, memory, and a display, one or more of which are connectable through well-known structure, such as through a bus. The remote electronic device 104 may optionally connect or communicate with a base station (not shown) or directly or indirectly with another computing device.

An advantage of the current design is that the trolling motor housing 28 of the trolling motor assembly 14 includes a built-in or integrated wireless communication module, such as the Wi-Fi module 108. The integrated nature of the wireless module allows the trolling motor assembly to transmit marine data to the remote electronic device 104 without the need for accommodating on the watercraft a multi-function device, such as a Fish Finder display unit, that is connected to the trolling motor assembly via cables. Rather, the user can simply employ a smartphone with the appropriate software application loaded thereon to communicate with and receive marine data from the trolling motor assembly 14 via the Wi-Fi module 108. This saves space on the watercraft and reduces the need for secondary pieces of equipment to be stored on the watercraft. Further, utilizing the releasable mounting, the trolling motor assembly is designed to be compact and easily attachable and detachable from the watercraft and generally easily movable/carryable. Thus, the trolling motor assembly can be quickly and easily removed from the watercraft for safe keeping and reinstalled quickly and connected to via the remote electronic device with little to no user interaction besides mounting of the trolling motor assembly to the watercraft. Thus, some example trolling motor assemblies described herein are designed for portable use and switchable mounting between different watercrafts or removal from a watercraft after each trip (such as may be useful for fisherman that utilize a Jon boat).

Figure 8:
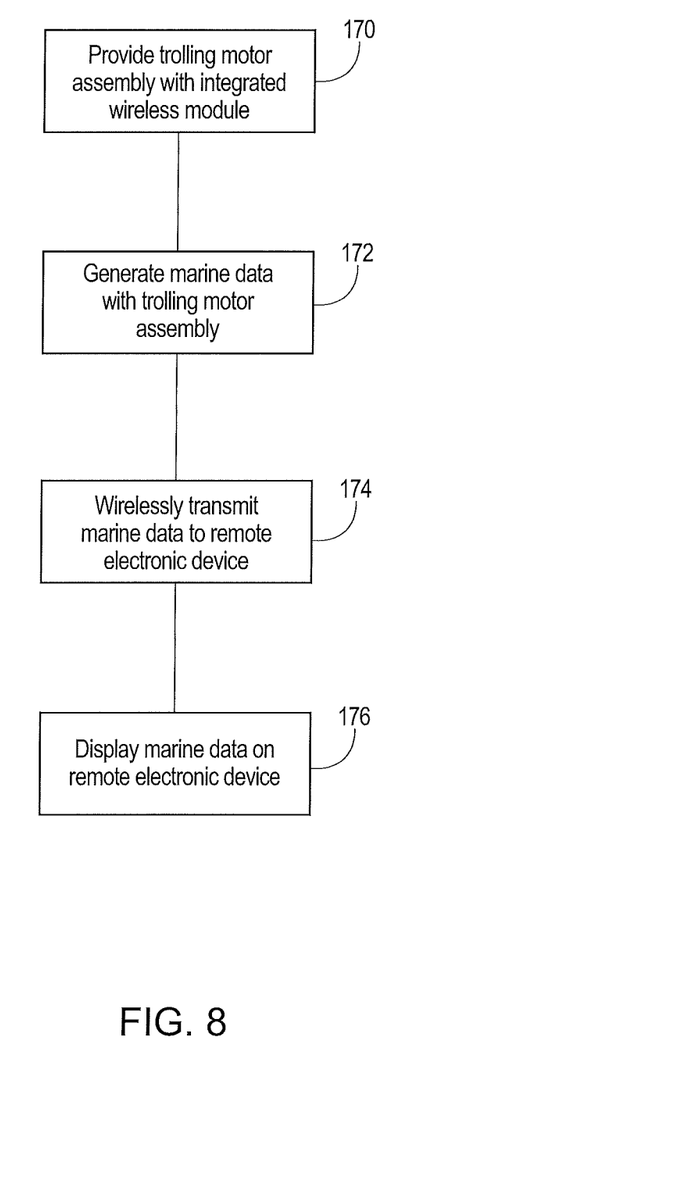
FIG. 8 is a flow chart diagram illustrating the method of wirelessly transmitting marine data between a trolling motor assembly and a remote electronic device according to the teachings of the present invention.

FIG. 8 depicts a flow chart diagram setting forth the transmittal of marine data, including for example sonar image data, between the trolling motor assembly 14 and the remote electronic device 104. The trolling motor assembly 14 is provided and can be mounted for example to a watercraft according to known techniques, step 170, such as by way of the releasable mount. The trolling motor assembly 14 includes a main shaft 22 having a main housing 30 that is attached to a first end thereof and a trolling motor section 16 having a trolling motor housing 28 that is coupled to a second end 26. The trolling motor housing 28 mounts therein a propulsion motor 32 and a sonar transducer assembly 160 that generates sonar data and one or more sensors 165 for generating other types of marine data, step 172. By way of example, the sonar transducer assembly 160 can employ one or more transducers to interrogate a selected underwater spatial region or area. The sonar transducer assembly can generate sonar return data corresponding to an underwater environment relative to the watercraft, wherein the sonar transducer assembly is configured to transmit sonar signals into the underwater environment, receive sonar returns from the underwater environment, and convert the sonar returns into the sonar return data. The sonar return data can be conveyed or transmitted to the main housing portion 30 of the trolling motor assembly 14. The sonar return data is then converted by one or more of the processors 110, 115 into sonar image data. The main housing 30 can include a wireless module, such as the Wi-Fi module 108. The marine data or selected types of marine data can be transmitted to the Wi-Fi module 108. The Wi-Fi module 108 can then in turn transmit the marine data, such as for example the sonar image data, to the remote electronic device 104, step 174. The remote electronic device 104 can include selected software for displaying the marine data, step 176.

It is to be understood that the example communication system 100 and trolling motor assembly 14 as shown throughout the Figures is not intended to be limited to the components that may be employed in a given implementation. Although only one of each component is illustrated in FIGS. 1-7, any number of each component can be included. For example, the trolling motor assembly 14 and/or the remote electronic device 104 may include one or more additional processors. In another example, the remote electronic device 104 may contain a number of different data storage media types and amounts. Although FIGS. 6-7 illustrate an example embodiment that includes a single sonar device and a single trolling motor assembly 14, it will be understood that in other example embodiments, a plurality of sonar devices may be connected to the remote electronic device 104.

While some embodiments can be implemented in computer hardware, various embodiments are capable of being distributed as a computing product in a variety of forms and are capable of being applied regardless of the particular type of machine or computer readable media used to actually effect the distribution. At least some aspects disclosed can be embodied, at least in part, in software. That is, the techniques may be carried out in a computer system or other data processing system in response to a processor, such as a microprocessor, executing sequences of instructions contained in a memory, such as ROM, volatile RAM, non-volatile memory, cache or a remote storage device. A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

The invention is described herein relative to illustrated embodiments. Those skilled in the art will appreciate that the present invention may be implemented in a number of different applications and embodiments and is not specifically limited in its application to the particular embodiment depicted herein.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A trolling motor assembly for use with a watercraft and for wirelessly communicating marine data with a remote electronic device, wherein the remote electronic device includes a marine display software application stored thereon and a display for displaying the marine data, the trolling motor assembly comprising:
   a main shaft having a first end and an opposed second end,
   a releasable mount for releasably mounting the trolling motor assembly to the watercraft,
   a trolling motor housing coupled to the second end of the main shaft and having mounted therein:
      a propulsion motor for providing propulsion power to the watercraft; and
      a sonar transducer assembly for generating sonar return data corresponding to an underwater environment relative to the watercraft, wherein the sonar transducer assembly is configured to transmit sonar signals into the underwater environment, receive sonar returns from the underwater environment, and convert the sonar returns into the sonar return data, and
   a main housing coupled to the first end of the main shaft and having mounted therein:
      a processor including a sonar signal processor for processing the sonar return data received from the sonar transducer assembly, wherein the sonar signal processor is configured to receive the sonar return data from the sonar transducer assembly and generate sonar image data based on the sonar return data, wherein the sonar image data is generated by the sonar signal processor of the main housing into a form that enables display of a sonar image on the display of the remote computing device such that all image processing to generate the sonar image is performed inside the main housing of the trolling motor assembly, wherein the sonar image illustrates a representation of the underwater environment relative to the watercraft, and
      a wireless module for wirelessly transmitting the marine data to the remote electronic device, wherein the marine data includes the sonar image data such that the sonar image data is displayable as the sonar image on the display of the remote electronic device using the marine display software application.

2. The trolling motor assembly of claim 1, wherein the wireless module comprises a Wi-Fi module.

3. The trolling motor assembly of claim 2, wherein the trolling motor housing further comprises one or more sensors for generating sensor related marine data, and wherein the sensor related marine data is received by the Wi-Fi module and wirelessly transmitted thereby to the remote electronic device.

4. The trolling motor assembly of claim 3, wherein the one or more sensors included in the trolling motor housing comprises at least a temperature sensor.

5. The trolling motor assembly of claim 1, wherein the main housing includes one or more sensors for generating marine data.

6. The trolling motor assembly of claim 5, wherein the one or more sensors included in the main housing comprises at least a wind sensor.

7. The trolling motor assembly of claim 1, wherein the wireless module comprises a short-range wireless communication module such that the wireless module is paired with a corresponding wireless module of the remote electronic device.

8. A trolling motor assembly for use with a watercraft and for wirelessly communicating marine data with a remote electronic device, the trolling motor assembly comprising:
   a releasable mount for releasably mounting the trolling motor assembly to the watercraft,
   a trolling motor housing connected to a main housing by a main shaft, wherein the main shaft has a first end and an opposed second end,
   wherein the trolling motor housing includes:
      a propulsion motor for providing motor power to the watercraft, and
      a marine data generator for generating the marine data, wherein the marine data generator comprises a sonar transducer assembly for generating sonar return data corresponding to an underwater environment relative to the watercraft, wherein the sonar transducer assembly is configured to transmit sonar signals into the underwater environment, receive sonar returns from the underwater environment, and convert the sonar returns into the sonar return data,
   wherein the main housing includes:
      a processor including a sonar signal processor for processing the marine data to form sonar image data that is displayable on the remote electronic device as a sonar image, wherein the sonar return data is processed by the sonar signal processor in the main housing to generate the sonar image data therefrom such that all image processing to generate the sonar image is performed inside the main housing of the trolling motor assembly, wherein the sonar image illustrates a representation of the underwater environment relative to the watercraft, and
      a wireless module for wirelessly transmitting the marine data including the sonar image data to the remote electronic device to cause display of the sonar image.

9. The trolling motor assembly of claim 8, wherein the wireless module comprises a Wi-Fi module.

10. The trolling motor assembly of claim 8, wherein the wireless module comprises a short-range wireless communication module such that the wireless module is paired with a corresponding wireless module of the remote electronic device.

11. The trolling motor assembly of claim 8, wherein the marine data generator further comprises one or more sensors for generating sensor type marine data.

12. A method of wirelessly transmitting marine data from a trolling motor assembly of a watercraft to a remote electronic device having a marine display software application stored thereon and a display for displaying the marine data, the method comprising:
providing a trolling motor assembly comprising:
a main shaft having a first end and an opposed second end,
a releasable mount for releasably mounting the trolling motor assembly to the watercraft,
a trolling motor housing coupled to the second end of the main shaft and having mounted therein:
a propulsion motor for providing propulsion power to the watercraft; and
a sonar transducer assembly for generating sonar return data corresponding to an underwater environment relative to the watercraft, wherein the sonar transducer assembly is configured to transmit sonar signals into the underwater environment, receive sonar returns from the underwater environment, and convert the sonar returns into the sonar return data, and
a main housing coupled to the first end of the main shaft and having mounted therein:
a processor including a sonar signal processor for processing the sonar return data received from the sonar transducer assembly, wherein the sonar signal processor is configured to receive the sonar return data from the sonar transducer assembly and generate sonar image data based on the sonar return data, and
a wireless module;
receiving the sonar return data from the sonar transducer assembly;
processing the sonar return data to generate the sonar image data, wherein the sonar image data is generated by the sonar signal processor of the main housing into a form that enables display of a sonar image on the display of the remote computing device such that all image processing to generate the sonar image is performed inside the main housing of the trolling motor assembly, wherein the sonar image illustrates a representation of the underwater environment relative to the watercraft; and
wirelessly transmitting the marine data to the remote electronic device, wherein the marine data includes the sonar image data such that the sonar image data is displayable as the sonar image on the display of the remote electronic device using the marine display software application.

13. The method of claim 12, wherein the wireless module comprises a Wi-Fi module.

14. The method of claim 13, wherein the trolling motor housing further comprises one or more sensors for generating sensor related marine data, and wherein the sensor related marine data is received by the Wi-Fi module and wirelessly transmitted thereby to the remote electronic device.

15. The method of claim 14, wherein the one or more sensors included in the trolling motor housing comprises at least a temperature sensor.

16. The method of claim 12, wherein the wireless module comprises a short-range wireless communication module, and wherein the method further comprises pairing the wireless module with a corresponding wireless module of the remote electronic device.

17. The method of claim 12, wherein the main housing includes one or more sensors for generating marine data.

18. The method of claim 17, wherein the one or more sensors included in the main housing comprises at least a wind sensor.

19. The trolling motor assembly of claim 1, wherein the sonar image data generated by the sonar signal processor is configured to be viewed in the software application of the remote electronics device as the sonar image without further image processing by the remote electronics device.

20. The trolling motor assembly of claim 1, wherein the main housing further comprises a screen integrated into the main housing, wherein the screen is configured to display the sonar image.

* * * * *